United States Patent [19]
van der Lely

[11] 3,923,096
[45] Dec. 2, 1975

[54] BUILDINGS

[76] Inventor: Cornelis van der Lely, 7, Bruschenrain, Zug, Switzerland

[22] Filed: Jan. 16, 1974

[21] Appl. No.: 433,765

[30] Foreign Application Priority Data
Dec. 20, 1972  Netherlands.................... 7217347

[52] U.S. Cl.................... 165/48; 98/32; 98/33 R
[51] Int. Cl.².......................................... F24F 13/00
[58] Field of Search............ 165/22, 50, 96, 40, 49, 165/48; 98/33 R, 33 A, 32

[56] References Cited
UNITED STATES PATENTS

| 2,483,896 | 10/1949 | Gay........................ | 165/49 |
| 3,468,239 | 9/1969 | Hart et al.............. | 98/40 D |
| 3,744,556 | 7/1973 | Church.................. | 165/96 |

Primary Examiner—Albert W. Davis, Jr.
Assistant Examiner—James D. Liles
Attorney, Agent, or Firm—Mason, Mason & Albright

[57] ABSTRACT

A multistory building comprised of a plurality of elongated, box-shaped prefabricated sections which are oriented side by side and stacked one on the other transverse to the length of the building, each section extending from one side to the other of the building. A circuit for air which has been heated or cooled and otherwise treated by filtration and humidity control defined throughout the building by the sections comprising a vertical air shaft, a horizontal channel over a central hallway on each story, the channel being in communication with the vertical air shaft and an air space between the ceiling and next higher floor of each section, an opening from the air space into the living quarters of each section, a further opening from the living quarters of the section into the hallway, and a still further communication from each hallway of each story to the staircase well, and finally a passageway from the lower portion of the staircase well to the lower portion of the vertical shaft via apparatus to heat or cool the air and otherwise treat same and introduce fresh air. The ceiling and floor adjacent the air space in the adjacent channel are heated or cooled by the air therein. A closure flap for closing the opening between the air space and living quarters below is adjustably opened by control from a thermostat in the living quarters.

11 Claims, 6 Drawing Figures

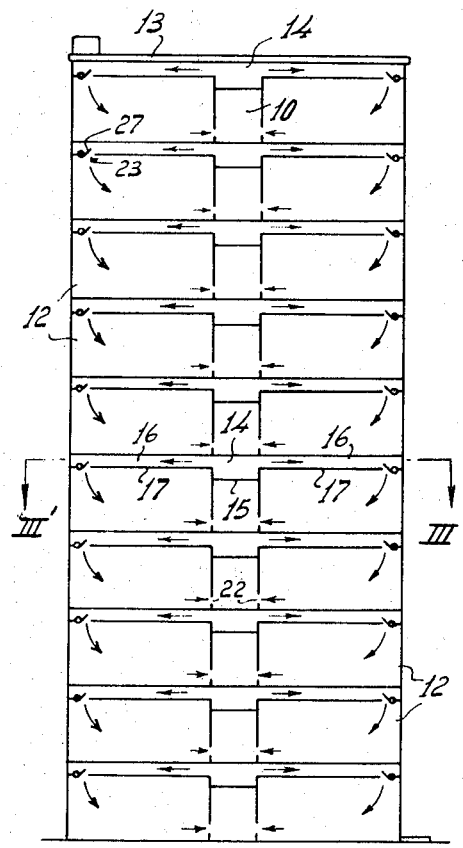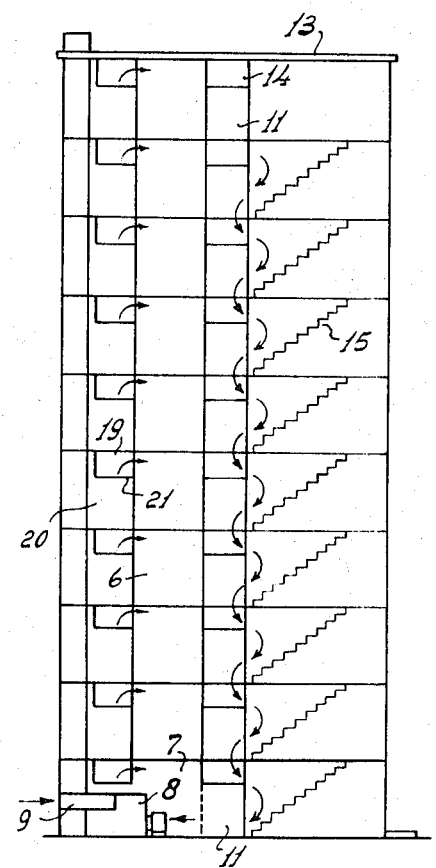
FIG. 4
FIG. 5

3,923,096

BUILDINGS

This invention relates to buildings.

According to the present invention there is provided a building comprising a plurality of stories each of which comprises a plurality of individual areas, an air-conditioning system for the individual areas, and at least one space common to at least some of said individual areas, this common space being adapted to be employed at least partly for transporting at least part of the air flow between the air-conditioning system and these individual areas.

BRIEF DECRIPTION OF THE DRAWINGS

For a better understanding of the invention and to show how the same may be carried into effect, reference will now be made, by way of example, to the accompanying drawings, in which:

FIG. 1 is a perspective view of a building, part of the outer facade being omitted, FIG. 2 is a diagrammatic sectional view of apartment spaces and common spaces of the ground floor taken on the line II—II in FIG. 1, FIG. 3 is a diagrammatic sectional view of a story above the apartment spaces and the common spaces of the ground floor taken on the lines III—III in FIG. 1, and III$^1$—III$^1$ in FIG. 4, FIG. 4 is a diagrammatic sectional view taken on the line IV—IV in FIG. 1, FIG. 5 is a diagrammatic sectional view taken on the line V—V in FIG. 1, and FIG. 6 is a vertical sectional view of a detail of the building of FIGS. 1 to 5.

DESCRIPTION OF THE PREFERRED EMBODIMENTS

Figure 1:
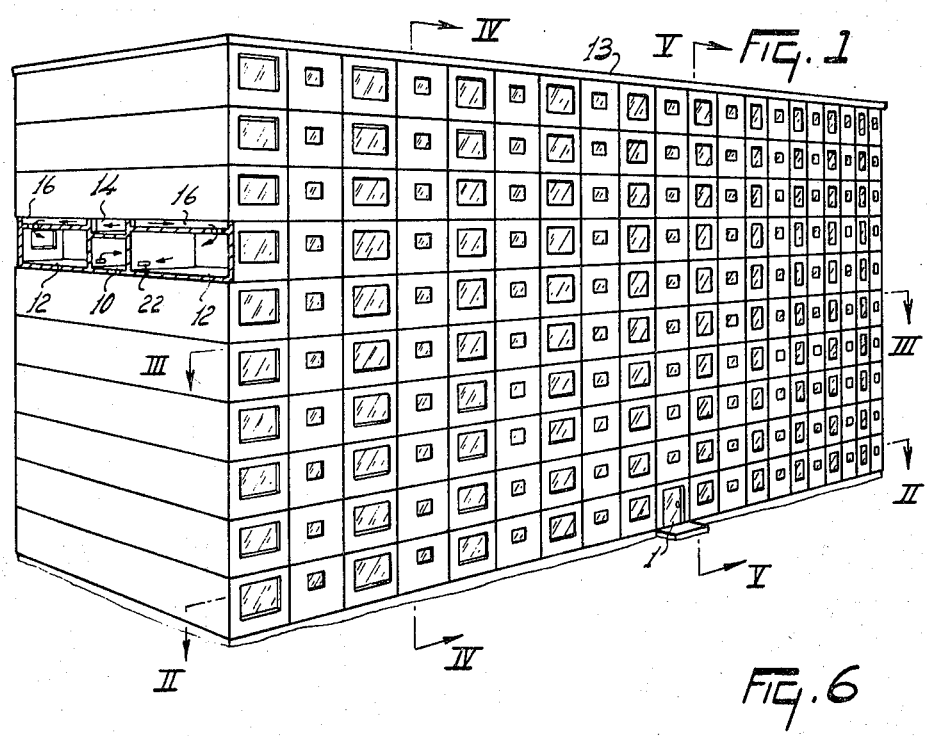

The prefabricated building shown in the Figures is composed of a plurality of stories, in the particular form shown ten stories, each of which contains a plurality of apartments. Although the particular building shown contains apartments, the invention is not restricted to buildings intended only for family occupancy and the like, since it may also be applied to buildings containing individual areas other than apartments such as areas used as offices or stores for storing goods, for example, cold stores.

In the building shown an entrance door 1 leads to the spaces of the building that are common to the dwellings, that is to a vestibule 2, which communicates through spring-controlled doors 3 with a hall 4. The entrance door 1 is located at the center of the direction of length of the building, and in this form, is in a position such that about the same number of apartment spaces or apartments are located in the building on each side of a vertical plane intersecting the entrance door and at right angles to the plane of the entrance door itself. Opening out into the hall 4 is a staircase well 5, extending in a vertical direction and forming the communication between the stories by staircases. The space of the hall 4 is furthermore limited by the entrance doors of two elevators 6 providing the mechanical transport between the stories.

With the hall 4 communicates furthermore a space 7 accommodating an air-conditioning system 8 and which is in open communcation with the hall 4. The system 8 is capable of drawing in fresh air through an intake channel 9 opening out in an outer facade of the building. At the side of the air-conditioning system 8 an air supply channel 9A is arranged, which extends in a vertical direction throughout the height of the building. The channel 9A is located between part of the outer facade of the building and the elevator wells of the elevators 6.

On either side of the hall 4 corridors 10 and 11 in line with each other extend in the direction of the major dimension of the building. On either side of these corridors 10 and 11 are arranged apartments or apartment spaces 12 of the story.

The stories lying above the ground floor are divided in a manner corresponding largely with that of the ground floor, but the space in each story from the second story up to the topmost story that is located as viewed on plan above the vestibule 2 and part of the hall 4, is used as an additional living space: whereas the space in each story of each story from the second up to the topmost storey located that is as viewed on plan above the space 7 serves in these higher stories at least partly as a storage space 20 common to the adjacent apartments.

The height of some common spaces, the corridors 10 and 11 and of each dwelling 12 is less than the height of the story in which they are diposed. Between each corridor 10 and 11 and the floor of the story above and, as far as the top storey is concerned, between the corridors 10 and 11 and the roof 13 a space 14 is provided. Thus each space 14 is defined by the floor of a corridor 10 or 11 (or by the roof 13) above; and, below, by a ceiling 15 of the corridor 10 or 11 below. A space 16 located between each apartment 12 and the floor of the storey above is limited, above by this floor; and, below, by a ceiling 17 of the apartment 12. The spaces 14 and 16 of each story are in open communication with one another and serve as supply ducts for air-conditioning air to be supplied to each apartment 12. The height of the space 14 is preferably about double the height of the space 16.

Figure 2:
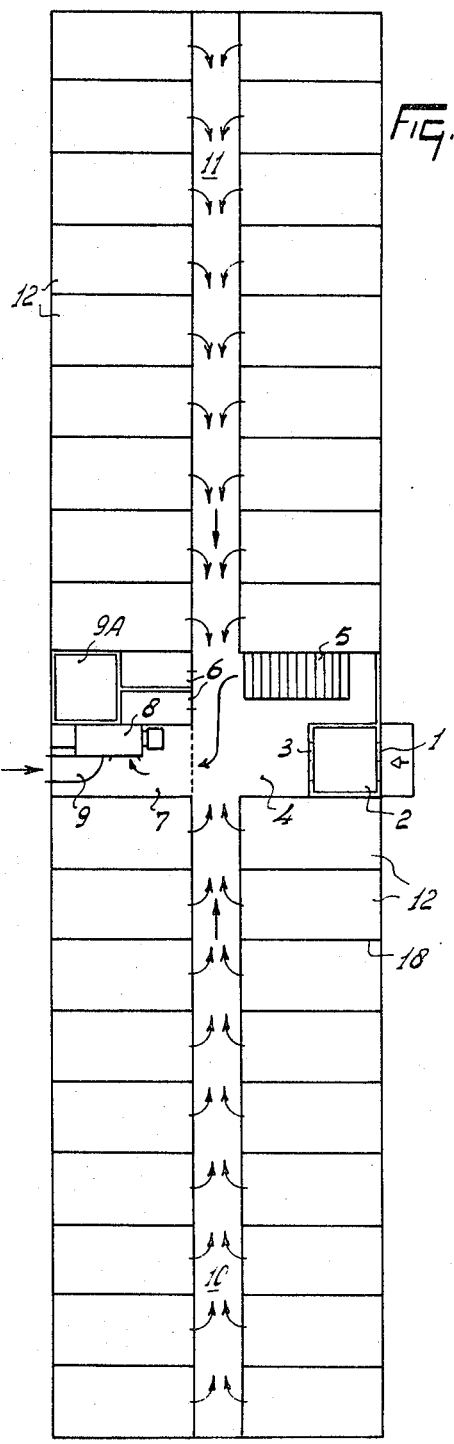

Vertical partitions 18 (FIG. 2) between two apartments 12 extend preferably over the whole height of a story and thus limit the space 16 above each apartment 12 on either side. Each space 16 is, of course, also limited by part of the outer facade of the building.

One of the insulated, boundary walls of the air supply channel 9A, that is to say that wall which forms part of the boundary wall of the space 7 of the ground floor, has an opening at the level of each from the second story to the topmost storey, this opening communicating with a space 19 (FIG. 5) located above the storage space 20 of the story. Between the space 19 and the storage space 20 a ceiling 21 is provided at the same level as the ceiling 15 above the corridors 10 and 11 of the same story. The space 19 is in open communication with the space 14 above the two corridors 10 and 11 of the same story.

Approximately midway along the length of each space 14, and hence also approximately midway along the length of each of the corridors 10 and 11 of each story, the space 14 has a blower (not shown) for compensating losses of pressure of the air flow from the system 8 into the space 14.

Figure 6:
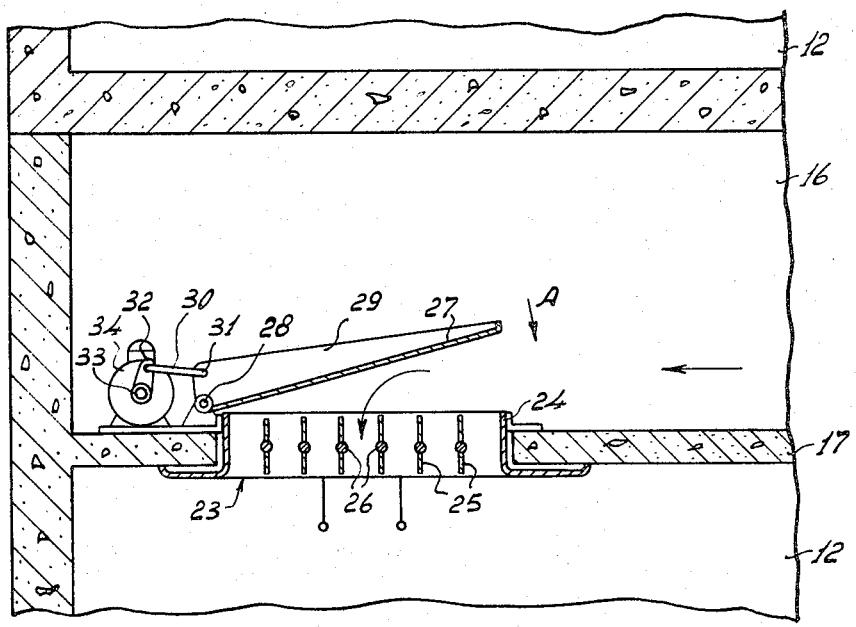

Between each apartment 12 and the adjacent common space, the corridors 10 and 11, a grating 22 is provided that can be closed. The ceiling 17 above each apartment 12 has, preferably near the outer facade, two openings 23 that can be closed (FIG. 6). Each opening 23 is enclosed by a metal rim 24 in which a plurality of equally spaced, parallel flaps 25 for controlling the direction of the stream of the air are mounted for pivoting about shafts 26. The flaps 25 can be manually adjusted to various positions about the pivotal shafts 26. The flaps 25 are interconnected so that in any adjusted position they are parallel to each other. Above the opening 23, that is to say in the space 16, a flap 27 is provided, the surface area of which is at least equal to the surface area of the opening 23, the flap 27 being adapted to turn about a horizontal shaft 28. The flap 27 has a flange 29, to which an arm 30 is pivotally attached by a shaft 31 extending parallel to the shaft 28. The end of the arm 30 remote from the flap 27 is pivoted to an arm 32 which turns about a shaft 33 extending parallel to the shaft 28. The shaft 33 is connected through a deceleration mechanism with an electric motor 34. The motor 34 is controlled by means of a thermostat in the dwelling 12. If the temperature in the apartment 12 changes to that of a given, adjusted value set at the thermostat, the motor 34 becomes operative so that the shaft 33 is turned through the deceleration mechanism and the flap 27 is turned in the direction of the arrow A in FIG. 6 depending upon, of course, whether the air in space 16 has been warmed or cooled relative to that in apartment 12

The building is conveniently erected by arranging side by side and stacking prefabricated building sections. Each such building section preferably has a three-dimensional steel framework, to which are joined parts of the floors, sidewalls top surfaces, and the like of two opposite apartments 12 (one on each side of the corridors 10 or 11). The prefabricated section thus has a major dimension equal to the smaller dimension of the building, viewed on plan. Also the parts of the building forming the vestibule 2, the hall 4 and the space 7 and the parts comprising part of the stair well 5, the elevator wells 6 and a portion of the intake channel 9 may be supplied in a prefabricated form. The top surface of each of these prefabricated sections may be formed by the floor of the section above.

The air-conditioning system 8 may comprise a central heating system and also a central cooling system for the air to be treated and a system for regulating the relative humidity of the air. The intake channel 9 preferably has a filter for removing impurities from the incoming air.

Figure 3:
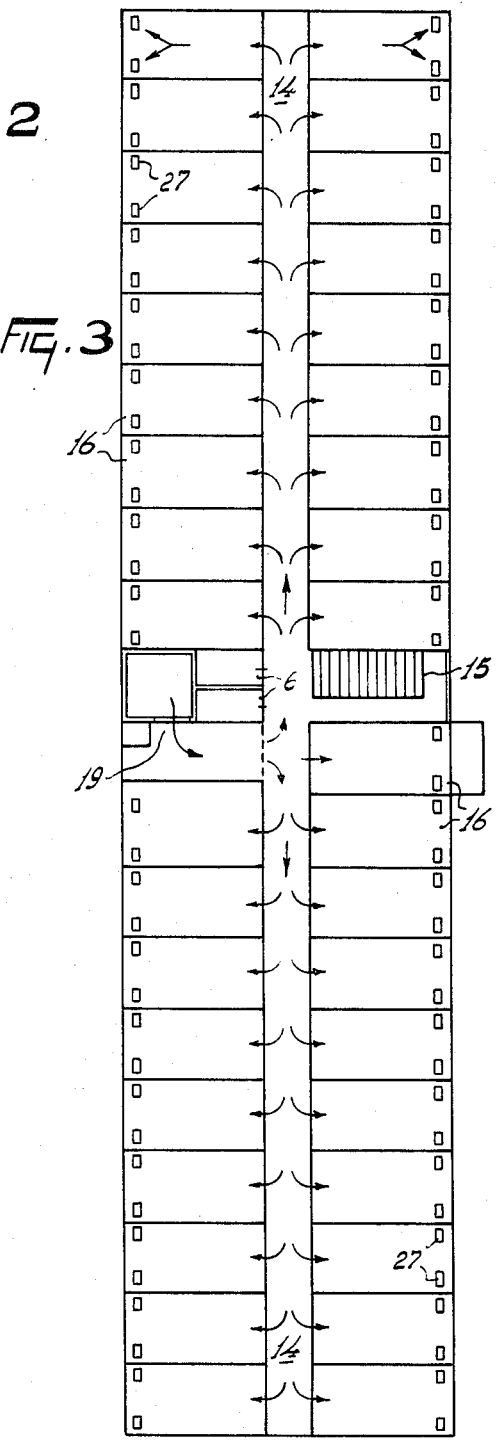

The air-conditioning system 8 draws at least a portion of the air to be treated in the form of fresh air through the intake channel 9. The air treated by the system 8 is blown by a blower associated with the system into the supply channel 9A so that the air can be distributed among all stories. From the supply channel 9A the air can penetrate in each story into the space 19, from which it is distributed among the two spaces 14 above the common corridors 10 and 11. At each apartment 12 of the story concerned the air can penetrate from the space 14 into the space 16 above the apartment via the openings 23 (see the arrows in FIG. 3). The air thus blown into the apartment 12 can escape through the gratings 22 and then reaches the common corridor 10 or 11, which serves as a drain channel for the air (see the arrows in FIG. 22). From the corridors 10 and 11 the used air is conveyed through a further common space, the staircase well 5, towards the ground floor, where the air attains the space 7 through the hall 4. In the space 7 at least a portion of the used air together with the fresh air supplied through the intake channel 9 is reintroduced into the system 8, after which a new cycle starts. The portion of the used air not recirculated through the system is preferably blown into the open air on the side of the building remote from the intake opening of the intake channel 9, which is preferably performed across gratings located in the doors 3 and near the entrance door 1. The ratio between the quantity of fresh air drawn-in by the system 8 and the used air to be recirculated is regulated by adjusting the position of a flap (not shown) in the intake channel and of a flap regulating the size of the supply opening in the system 8 for used air.

In this way the number of air channels of the building is minimized since the drain channels are formed by common spaces, of the building, already in existence, that is to say in the form described, by the common corridors 10 and 11, the staircase well 5 and the hall 4.

As a matter of course, the direction of flow of air may be reversed so that the common spaces are employed for the supply of the air treated and the spaces 14, 16 and 19 as well as the channel 9A for draining the used air. In this case the flaps 25 and 27 have, of course, to be disposed in the partitions between the apartments 12 and the corridors 10 and 11. It is, of course, also possible on the basis of the air movements described to feed a apartment 12 from the space 16 instead of a lower dwelling 12, in which case the air introduced on the side of the floor is distributed in the space from below.

The air flow as first described has the advantage that the air supplied into the space 16 heats or cools the floor of the apartments 12 above, while used air produces a climate in the common spaces approaching the desired climate in the dwellings. The vestibule 2 serves as an insulating space.

Although various features of the building have been described, and illustrated in the drawings, are set forth in the following claims as inventive features, it is to be noted that the invention is not necessarily limited to these features and that it encompasses all of the features that have been described and illustrated both individually and in various combinations.

Having thus descibed my invention, what I claim as new and desire to secure by Letters Patent of the United States is:

1. A multistory building which is comprised of a plurality of superimposed elongated box-shaped prefabricated sections, each of which encloses a portion of the living space in the building, each said section comprising a floor, at least one wall and a ceiling member, said wall extending higher than the top of said ceiling member whereby an air space constituting a channel for transporting air is defined in each said section by the top of said ceiling member, air conditioning means provided in the building in passage communication with said air space of each said section whereby air conditioned by said air conditioning means is received in said air space, said wall being adjacent said air space and the bottom of the floor of the section next above being adjacent to and defining the top of said air space, each said ceiling member and said floor comprising heat exchange means between said air space and the living space in the sections adjacent each whereby with a difference in temperature between the air in said air space and the air in said living space a heat transfer occurs through said member and said floor relative to said living space each said section having an opening in said ceiling member for the passage of air between said air space and the living space defined by such section, closure means in said opening and adjustment means for selectively opening said closure means, and thermostatic means in the living space provided by such section adapted to control said adjustment means.

2. A multistory high rise type building which comprises a plurality of stories, means for conditioning air located on a lower of said stories, a vertical air supply channel leading from said means for conditioning air to each said story, a corridor provided on each said story which is spaced between a plurality of individual areas on each said story and substantially spaced apart from outer walls provided for the building, each said individual area being provided with a floor, a ceiling and vertical walls, said ceiling of each said individual area being spaced from the floor of said individual area next above, each corridor also being provided with a floor and ceiling and being defined lengthwise by walls of said individual spaces, said ceiling of said corridor being spaced from the floor of a said further corridor provided in the next higher story, said space thus provided immediately above each said corridor having an air flow communication with said vertical air supply channel, said space immediately above each said corridor individually having an air flow communication with each space provided immediately above the ceiling of each individual area of the same story, and air flow passage from each said space immediately above the ceiling of each said individual area into such individual area, a further air flow passage from said individual space to the corridor of the same story, and a still further air flow communication provided between each said corridor of each said story and said means for conditioning air.

3. A building in accordance with claim 2 wherein said still further air flow communication is provided by a stairwell provided between said stories.

4. A building in accordance with claim 2 wherein closure means is provided in each said air flow communication between said space immediately above at least one of said individual areas and said one area.

5. A building in accordance with claim 2 wherein a part of each said corridor and each said individual area and said spaces immediately over each comprise a prefabricated section.

6. A building as claimed in claim 4, wherein said closure means comprises at least one flap provided near said opening adapted to turn about a pivotal axis.

7. A building as claimed in claim 6, wherein the position of said flap with respect to said opening is adapted to be controlled by means of a thermostat.

8. A building as claimed in claim 6, including manual adjustment means operatively associated with said flap, wherein the position of said flap with respect to said opening is manually adjustable by said adjustment means so that the direction of the incoming air can be controlled.

9. A building as claimed in claim 5, wherein each said prefabricated section comprises a three-dimensional metal framework.

10. A building as claimed in claim 9, wherein at least part of the walls and floor of said sections join said metal framework.

11. A building as claimed in claim 2, wherein each said corridor extends between two groups of said individual areas.

* * * * *